United States Patent

Kobayashi et al.

[11] Patent Number: 5,977,505
[45] Date of Patent: Nov. 2, 1999

[54] ELECTRIC RESISTANCE WELDING METHOD WITH UNEQUAL FORCE APPLICATION

[75] Inventors: Nobuo Kobayashi; Isao Bundou, both of Saitama-ken, Japan; Toshihiro Murakawa, Columbus, Ohio; Kouji Oda; Toshiaki Nagasawa, both of Saitama-ken, Japan

[73] Assignee: Honda Giken Kogyo Kabushiki Kaisha, Tokyo, Japan

[21] Appl. No.: 09/034,009

[22] Filed: Mar. 2, 1998

[30] Foreign Application Priority Data

Mar. 13, 1997 [JP] Japan .................................. 9-058686

[51] Int. Cl.$^6$ .................................................. B23K 11/10
[52] U.S. Cl. ............................................................ 219/91.2
[58] Field of Search .............................. 219/86.1, 86.51, 219/86.61, 89, 91.2

[56] References Cited

U.S. PATENT DOCUMENTS 1,206,890 12/1916 Murray et al. .......................... 219/91.2
5,030,814 7/1991 Tange et al. .

FOREIGN PATENT DOCUMENTS 6-210459 8/1994 Japan .
9-277060 10/1997 Japan .
1682083 10/1991 U.S.S.R. .

*Primary Examiner*—Gregory Mills
*Attorney, Agent, or Firm*—Armstrong, Westerman, Hattori, McLeland & Naughton

[57] ABSTRACT

When a workpiece which is made up by laminating a plurality of plates of different thicknesses is welded by using a spot welding gun having a pair of electrode tips, the electrode force to the workpiece by one of the electrode tips, which is positioned on the side of a thinner plate, is made larger that the electrode force to the workpiece by the other of the electrode tips. The contact pressure on the side of the thinner plate becomes larger with the result that the contact resistance decreases. Therefore, the nugget on the side of the thinner plate becomes smaller than the nugget on the side of the thicker plate.

1 Claim, 4 Drawing Sheets

ELECTRIC RESISTANCE WELDING METHOD WITH UNEQUAL FORCE APPLICATION

BACKGROUND OF THE INVENTION

1. Field of the Invention

The present invention relates to an electric resistance welding method for welding a workpiece which is made up by laminating a plurality of sheets of metal of different thicknesses, the welding being made by means of a spot welding gun having a pair of electrode tips.

2. Description of the Related Art

A spot welding gun is arranged such that a workpiece is pinched between a pair of electrode tips and is pressed (i.e., an electrode force is applied) and, in this state, the electrode tips are charged with electricity to thereby weld the workpiece by electric resistance welding. Conventionally, an equalizing mechanism is built in the spot welding gun in order to substantially equalize the electrode forces of both electrodes to the workpiece.

When a workpiece W which is made up by laminating a thin sheet of metal (also called a thin plate) b on top of two thick sheets of metal (also called thick plates) "a", "a" as shown in FIGS. 6A, 6B is subjected to electric resistance welding, if an electrode force of each of the electrode tips T to the workpiece W is made even, there will be formed a nugget N (i.e., a molten portion due to heat generation by resistance during electric charging) of the same size between the thick plates "a", "a" and between the upper thick plate "a" and the thin plate b. As shown in FIG. 6A, if the nugget N is formed in such a size as to be sufficient to secure a weld strength between the thick plates "a", "a", the nugget N on the side of the thin plate b will reach the surface of the thin plate b. This will cause the occurrence of spatters and/or adhesion of the electrode tip to the workpiece through melting. Therefore, it becomes necessary to decrease the amount of electric charging to thereby minimize the nugget N to suit the thin plate b, as shown in FIG. 6B. As a consequence, it becomes difficult to secure a weld strength between the thick plates "a", "a".

In view of the above-described point, the present invention has an object of providing an electric resistance welding method in which the occurrence of spatters and/or adhesion of the electrode tip to the workpiece through melting is prevented and in which the weld strength is improved.

SUMMARY OF THE INVENTION

In order to attain the above and other objects, the present invention is an electric resistance welding method for welding a workpiece with a spot welding gun having a pair of electrode tips, the workpiece being made by laminating a plurality of sheets of metal of different thicknesses, characterized in that an electrode force against the workpiece by one of the electrode tips, said one electrode tip being located on the side of a sheet of metal of smaller thickness, is made larger than an electrode force to the workpiece by the other of the electrode tips.

According to the present invention, the contact pressure on the side of the thinner sheet of metal (thinner plate) becomes larger than the contact pressure on the side of the thicker plate. Therefore, the contact resistance on the side of the thinner plate becomes smaller than the contact resistance on the side of the thicker plate, with the result that the amount of resistance heat to be generated on the side of the thinner plate becomes smaller than the amount of resistance heat to be generated on the side of the thicker plate. Consequently, it is possible to make smaller the nugget on the side of the thinner plate to thereby prevent the occurrence of spattering and/or adhesion of the electrode tip to the workpiece through melting. It is also possible to make larger the nugget on the side of the thicker plate to thereby improve the weld strength.

In order to make the electrode force to the workpiece by one of the electrode tips larger than the electrode force to the workpiece by the other of the electrode tips, it is preferable to employ the following steps. Namely, the workpiece is pinched by both the electrode tips such that the electrode forces to the workpiece by both the electrode tips become equal to each other, and that gun main body of the spot welding gun which supports both the electrode tips is thereafter urged in a direction in which said one electrode tip is moved to apply the electrode force to the workpiece.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
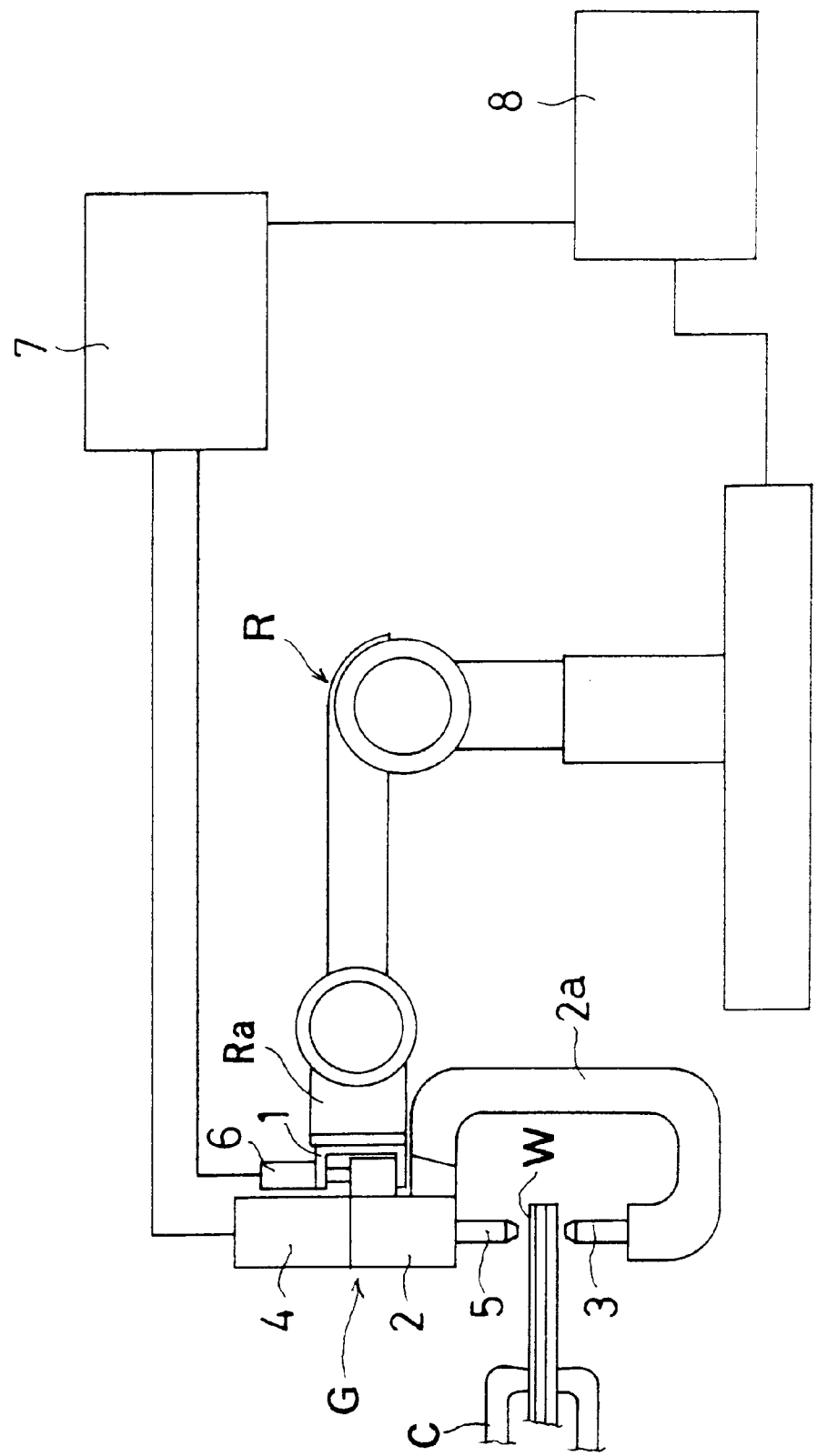
FIG. 1 is a schematic diagram of one example of a welding equipment which is used to carry out the method of the present invention.

With reference to FIG. 1, reference letter R denotes a welding robot. A welding gun for spot welding (also called a spot welding gun) G is attached to a wrist portion Ra on an operating end of the welding robot R. The spot welding gun G is moved to each of the weld spot positions of a workpiece W which is supported by a clamping device C, thereby performing electric resistance welding to the workpiece W.

Figure 2:
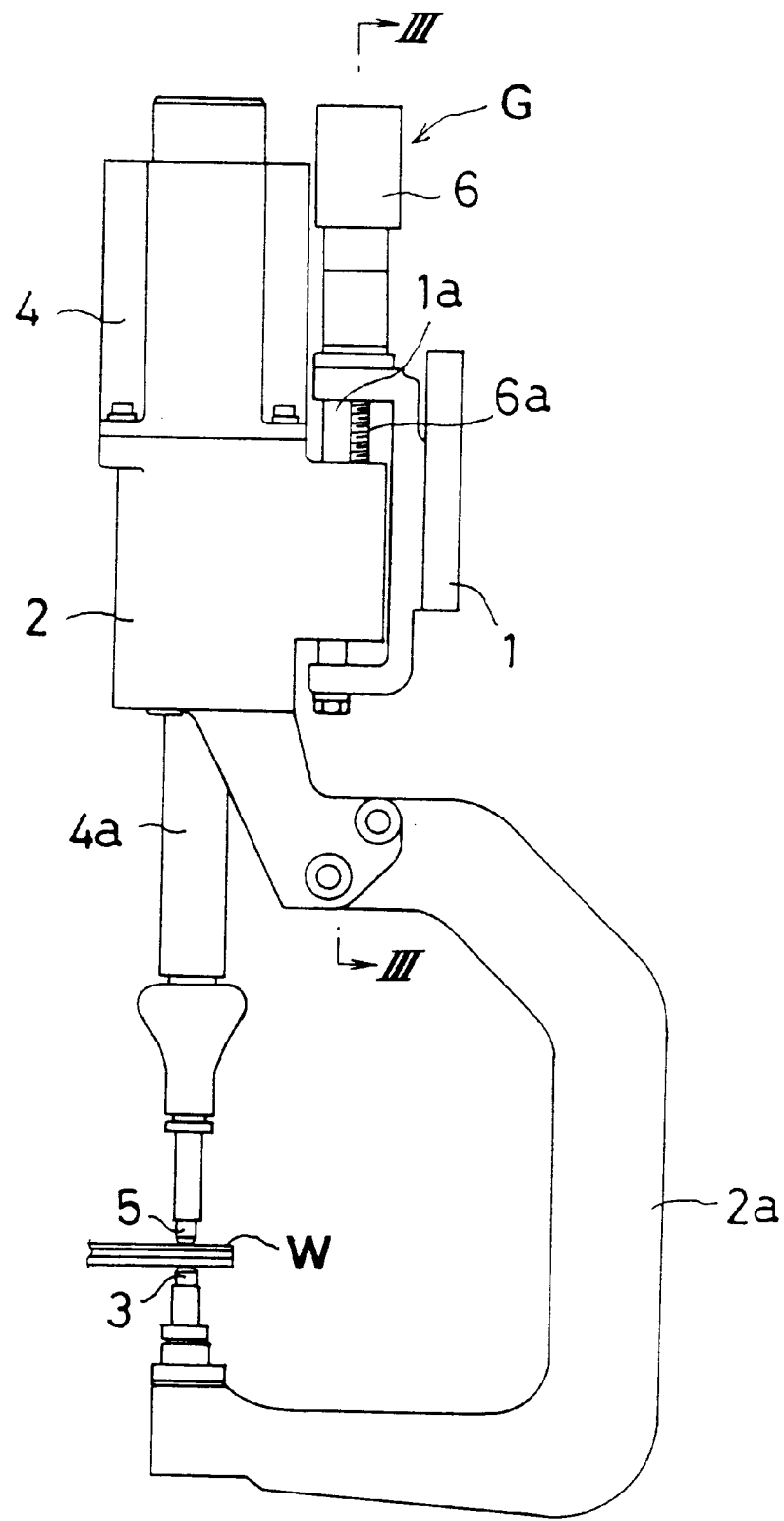
FIG. 2 is an enlarged side view of a welding gun which is used in the welding equipment shown in FIG. 1.

The spot welding gun G is provided, as shown in FIG. 2, with a gun main body 2 which is supported on a gun support bracket 1 so as to be movable up and down (i.e., vertically), the gun supporting bracket 1 being fixed to the wrist portion Ra. The gun main body 2 is provided with a C-shaped yoke 2a which is elongated downward. At an end of the lower portion of the C-shaped yoke 2a there is attached a lower electrode tip 3 which serves as a stationary electrode tip. On an upper end of the gun main body 2 there is mounted a pressing source 4 (i.e., a source for applying an electrode force) which is made up of a servomotor. A rod 4a which is moved up and down by the pressing source 4 via a ball screw (not illustrated) which is disposed inside the gun main body 2 is projected downward of the gun main body 2. To a lower end of the rod 4a there is attached an upper electrode tip 5, which serves as a movable tip, in a manner to face (or lie opposite to) the lower electrode tip 3.

Figure 3:
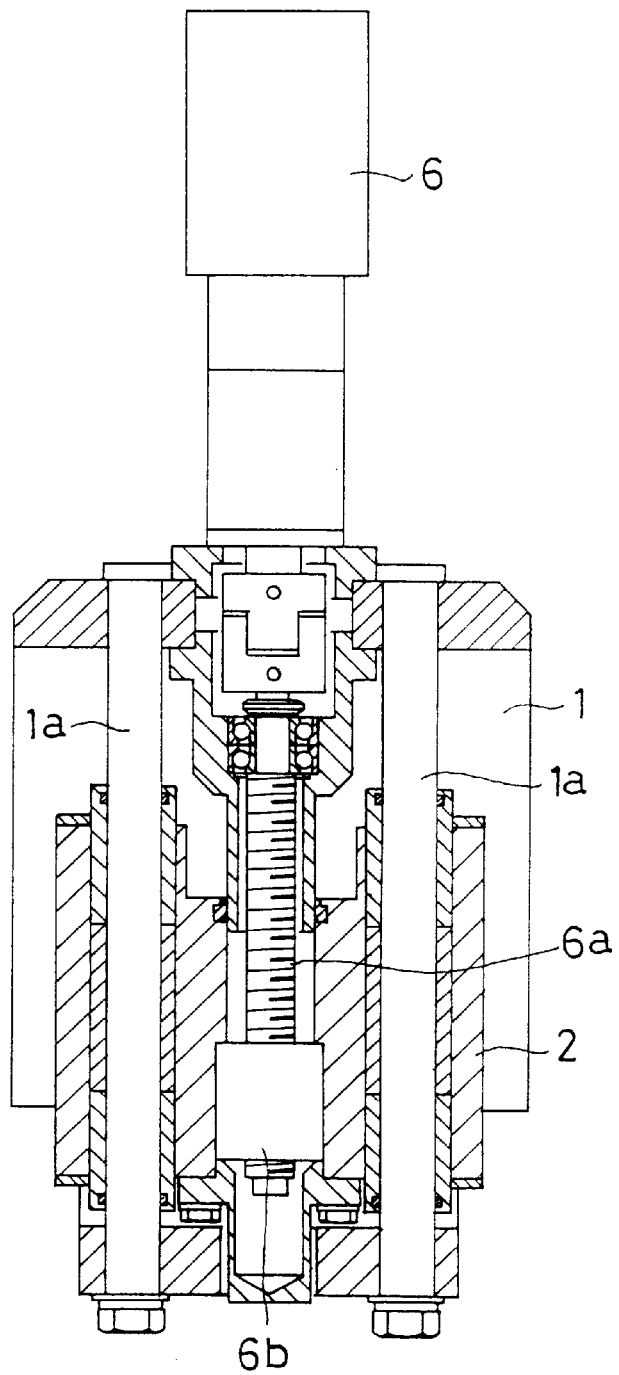
FIG. 3 is a cross-sectional view taken along the line III—III in FIG. 2.

The gun main body 2 is slidably supported, as shown in FIG. 3, by a pair of vertically elongated guide bars 1a, 1a which are fixed to the gun support bracket 1. On an upper end of the gun support bracket 1, there is mounted a driving source 6 which is made up of a servomotor. A ball screw 6a which is connected to the driving source 6 is inserted in a threaded (or screwed) manner through a nut 6b which is fixed to the gun main body 2. The gun main body 2 can thus be moved up and down by the driving source 6.

The pressing source 4 and the driving source 6 are controlled by a gun controller 7. When the spot welding gun G has reached each of the weld spot positions of the workpiece W, the pressing source 4 and the driving source 6 are operated by receiving a signal from a robot controller 8. The workpiece W is pinched and pressed (i.e., an electrode force is applied) between the lower electrode tip 3 and the upper electrode tip 5 and is subjected, in this state, to electric resistance welding by charging electricity to the electrode tips 3, 5.

Figure 4:
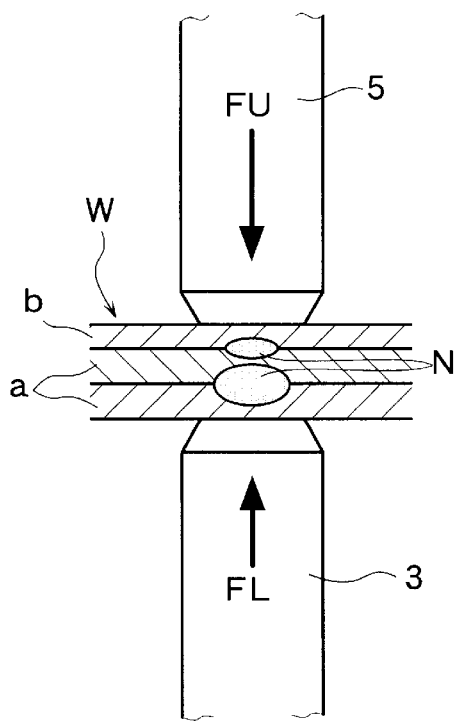
FIG. 4 is a schematic sectional view showing the welded condition of one workpiece according to the method of the present invention.

Here, as shown in FIG. 4, in a weld spot position of the workpiece W which is made up by laminating a steel sheet b which is small in thickness (hereinafter called a thin plate) on top of two steel sheets which are larger in thickness (hereinafter called thick plates) "a", "a", the electrode force FU, to the workpiece W, of the upper electrode tip 5 which is located on the side of the thin plate b is made larger than the electrode force FL, to the workpiece W, of the lower electrode tip 3. In order to attain a condition of FU>FL, the lower electrode tip 3 is first brought into contact with the lower surface of the workpiece W by the upward movement of the gun main body 2 by means of the driving source 6. Also, the upper electrode tip 5 is lowered by the pressing source 4 to thereby bring the upper electrode tip 5 into contact with the upper surface of the workpiece W. According to these operations, the electrode force of the pressing source 4 operates evenly on the upper electrode tip 5 and on the lower electrode tip 3 via the gun main body 2. Then, the gun main body 2 is pushed down by the driving source 6. At this time, if the position of the pressing source 4 is controlled such that the relative position of the upper electrode tip 5 relative to the gun main body 2 does not vary, the electrode force FU of the upper electrode tip 5 increases by an amount equivalent to the push down force of the gun main body 2. On the other hand, the electrode force FL of the lower electrode tip 3 decreases by an amount equivalent to the push down force of the gun main body 2, whereby a condition of FU>FL is attained. Further, if the torque of the pressing source 4 is controlled such that the electrode force FU of the upper electrode tip 5 becomes constant, the electrode force FU of the upper electrode tip 5 by the pushing down by the gun main body 2 does not vary, but the electrode force FL of the lower electrode tip 3 decreases by an amount equivalent to the push down force of the gun main body 2. A condition of FU>FL is also attained in this case.

When the condition of FU>FL has been attained, the workpiece W will deflect downward so that the reaction force of deflection of the workpiece W becomes equal to the difference ΔF between FU and FL, i.e., so that there is attained a condition of ΔF=2fa+fb, where fa is the reaction force of deflection of each of the thick plates "a" and fb is the reaction force of deflection of the thin plate b. At this time, the contact pressure between the thick plates "a", "a" becomes FL+fa, and the contact pressure between the thick plate "a" and the thin plate b becomes FL+2fa. Thus, the contact pressure on the side of the thin plate b becomes larger.

As a result, the contact resistance between the thick plate "a" and the thin plate b becomes relatively smaller and, thus, the amount of heat generation by resistance at the time of electric charging also becomes relatively smaller. The nugget N on the side of the thin plate b thus becomes smaller than the nugget N on the side of the thick plate "a". As a result, the occurrence of spatters and/or adhesion of the electrode tip to the workpiece through melting on the side of the thin plate b can be prevented, and the weld strength between the thick plates "a", "a" can be improved.

Figure 5:
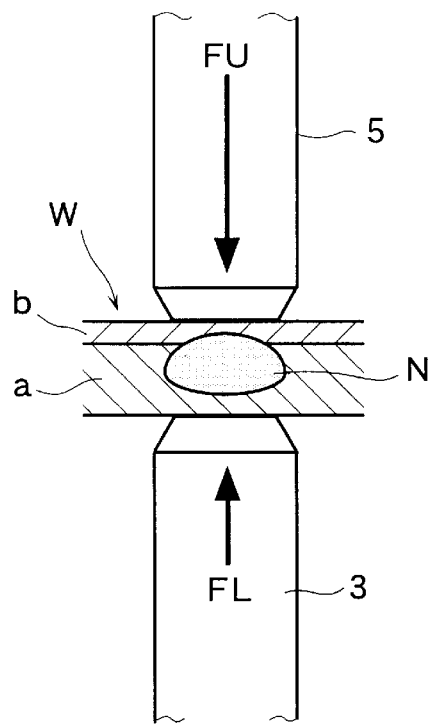
FIG. 5 is a schematic sectional view showing the welded condition of another workpiece according to the method of the present invention.
Figure 6A:
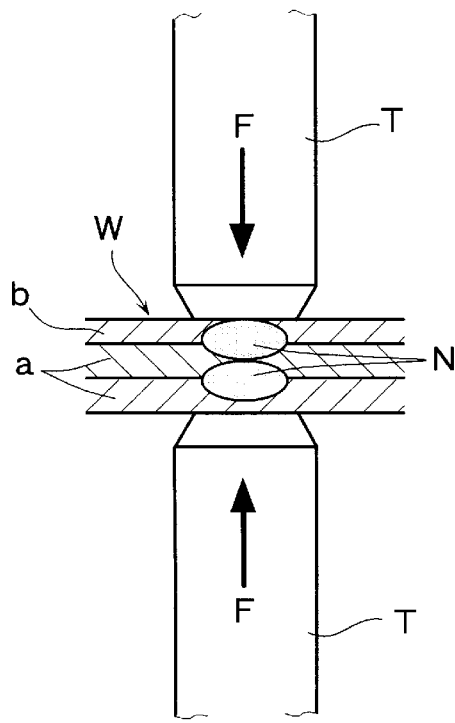
FIG. 6A is a schematic sectional view showing the welded condition of a workpiece according to the conventional welding method in which the amount of electric charging is made large.
Figure 6B:
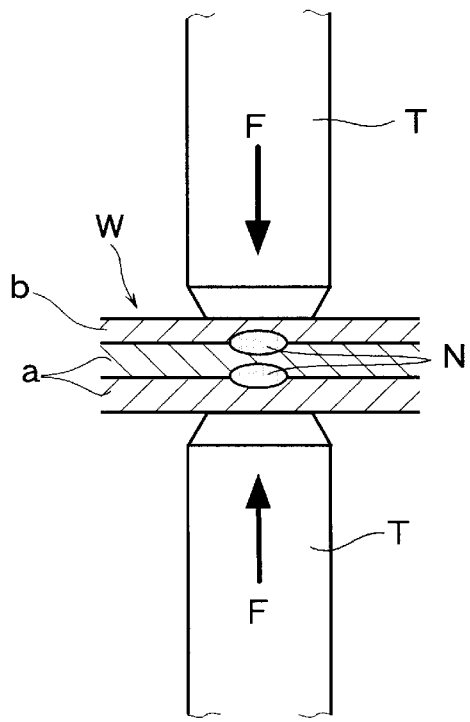
FIG. 6B is a schematic sectional view showing the welded condition of a workpiece according to the conventional welding method in which the amount of electric charging is made small.

Further, as shown in FIG. 5, also in a workpiece W in which one thin plate b is laminated on top of one thick plate "a", the electrode force FU of the upper electrode tip 5 which is located on the side of the thin plate b is made larger than the electrode force FL of the lower electrode tip 3. According to this arrangement, the contact resistance between the lower electrode tip 3 and the thick plate "a" becomes larger than the contact resistance between the upper electrode tip 5 and the thin plate b. The center of heat generation during electric charging therefore deviates to the side of the thick plate "a", and the size of the nugget N becomes smaller on the side of the thin plate b. The occurrence of spattering and/or adhesion of the electrode tip to the workpiece through melting can be effectively prevented. It is readily apparent that the above-described electric resistance welding method meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An electric resistance welding method for welding a workpiece with a spot welding gun having a pair of electrode tips, said workpiece being made by laminating a plurality of sheets of metal of different thicknesses, in which an electrode force applied to the workpiece by one of said electrode tips, said one electrode tip being located on the side of a sheet of metal of smaller thickness, is made larger than an electrode force applied to the workpiece by the other of said electrode tips, comprising:

pinching the workpiece between both said electrode tips such that the electrode forces to the workpiece by both said electrode tips become equal to each other, and urging a gun main body of said spot welding gun which supports both said electrode tips in a direction in which said one electrode tip is moved to apply the electrode force to the workpiece.

\* \* \* \* \*